United States Patent
Alberth, Jr. et al.

(10) Patent No.: US 7,421,264 B2
(45) Date of Patent: Sep. 2, 2008

(54) DEVICE AND METHOD FOR REDUCING VIBRATION EFFECTS ON POSITION MEASUREMENT

(75) Inventors: William Alberth, Jr., Crystal Lake, IL (US); Lawrence Schumacher, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 712 days.

(21) Appl. No.: 10/282,655

(22) Filed: Oct. 29, 2002

(65) Prior Publication Data

US 2004/0082306 A1     Apr. 29, 2004

(51) Int. Cl.
*H04B 1/10* (2006.01)

(52) U.S. Cl. ............... 455/283; 455/552.1; 455/153.1; 455/556.1

(58) Field of Classification Search ........... 455/283, 455/456, 567, 566, 526, 552, 456.1, 153.1, 455/461, 466, 457, 194.1, 552.1, 550.1, 63.1, 455/317; 342/357.09, 357.1, 357.08

See application file for complete search history.

(56) References Cited

U.S. PATENT DOCUMENTS

| | | | | |
|---|---|---|---|---|
| 5,827,965 A | * | 10/1998 | Nakagawa et al. | 73/488 |
| 5,905,460 A | * | 5/1999 | Odagiri et al. | 342/357.06 |
| 6,107,960 A | * | 8/2000 | Krasner | 342/357.09 |
| 6,426,719 B1 | * | 7/2002 | Nagareda et al. | 342/357.06 |
| 6,546,257 B1 | * | 4/2003 | Stewart | 455/456.3 |
| 6,574,489 B1 | * | 6/2003 | Uriya | 455/567 |
| 6,575,489 B1 | * | 6/2003 | White | 280/613 |
| 6,799,050 B1 | * | 9/2004 | Krasner | 455/456.1 |
| 2001/0023197 A1 | * | 9/2001 | Shibata | 455/567 |
| 2002/0002036 A1 | * | 1/2002 | Uehara et al. | 455/41 |
| 2002/0082056 A1 | * | 6/2002 | Mandai et al. | 455/567 |
| 2002/0115450 A1 | * | 8/2002 | Muramatsu | 455/456 |
| 2003/0134626 A1 | * | 7/2003 | Himmel et al. | 455/419 |
| 2005/0079846 A1 | * | 4/2005 | Sendonaris et al. | 455/255 |

FOREIGN PATENT DOCUMENTS

| | | |
|---|---|---|
| CN | 1164891 A | 11/1997 |
| CN | 1319961 A | 10/2001 |
| EP | 0789223 A1 | 8/1997 |
| JP | 001122554 A1 * | 1/2001 |
| JP | 2001189776 A | 7/2001 |
| JP | 001122554 A1 * | 8/2001 |

\* cited by examiner

*Primary Examiner*—Tan Trinh
(74) *Attorney, Agent, or Firm*—Vedder Price P.C.

(57) ABSTRACT

A device (10) for reducing vibration effects on position measurement includes a receiver (12) for providing position signals (13); and a vibration control circuit (18) operative to control position information generation based on the position signals (13), to prevent position information generation during mechanical vibration of the device (10). A method for reducing vibration effects on position measurement includes receiving position signals through a receiver; and controlling position information generation based on the position signals to prevent the position information generation during mechanical vibration of the device.

29 Claims, 5 Drawing Sheets

FIG. 2 —PRIOR ART—

DEVICE AND METHOD FOR REDUCING VIBRATION EFFECTS ON POSITION MEASUREMENT

BACKGROUND OF THE INVENTION

Electronic devices, such as cellular telephones, Internet appliances, personal digital assistants (PDA) and other devices are being used for more than just providing voice and visual communication between parties. Today, such electronic devices are equipped with position measurement circuitry, such as global positioning system (GPS) measurement or other non-satellite based position measurement circuitry that is capable of determining the position of the electronic device relative to a given point. For example, cellular telephones include one or more antennas for receiving voice, data and position signals, a processor which formats or otherwise filters the received signals, a vibrator for providing the user with an indication that a voice or data signal has been received and a reference signal generator, such as a temperature compensated reference oscillator or crystal oscillator that provides control signals that, among other things, control position measurement operations.

Position measurements are sensitive to small changes or variations in control signal frequency, which may be caused by mechanical vibration. Conventional methods employed to reduce the effects of vibration on position measurements include mechanically reinforcing the position measurement circuitry to the device housing or other interior portions of the device. A drawback associated with mechanical reinforcement is that it takes up relatively large amounts of space within the device housing; thereby increasing the overall size of the device. With the ever increasing importance of scaling down, or reducing, the size of mobile and non-mobile electronic devices, mechanical reinforcement impedes any size reduction efforts, and may not be achievable in very compact devices of the type preferred by consumers.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which.

DETAILED DESCRIPTION OF THE INVENTION

A method dynamically reduces the adverse effects on efficiency caused by generating position information during mechanical vibration of the device. The position information may be generated as a result of performing a position measurement operation, such as a GPS measurement or other suitable position measurement calculation, and the vibration may be caused by the activation of a vibrator or other disturbance such as the device being dropped or shaken. In an exemplary embodiment of the present invention, a mobile communication device, such as a cellular telephone includes a receiver for providing position signals; and a vibration control circuit operative to control position information generation, such as by shutting off or otherwise deactivating a vibrator during position information generation, pausing position information generation until the vibration is terminated, or aborting position information generation based on the position signals, to prevent position information generation during mechanical vibration of the device.

Variations in control signal frequency may, for example, be caused by the electronic device being shaken, or the reference signal generator being disturbed in some fashion, while a position is being determined. For example, when a vibrator mechanically coupled to the position generator becomes active, the reference signal generator, along with the other components of the electronic device, will shake. This shaking may cause the control signal to have varying frequency characteristics. It is possible that in some devices, position measurement performance may be degraded, such as by requiring more time to calculate the position, when the device vibrates. The present invention permits an increase in the position generator's efficiency, such as by decreasing the time required to determine the position, by not performing vibration sensitive position identifying operations while vibrations occur. As a consequence, unnecessary battery consumption can be avoided, or shared resources used for position location can be allocated to other more beneficial operations while position detection performance is not optimum. An exemplary embodiment of the present invention will now be described with reference to FIGS. 1-6.

Figure 1:
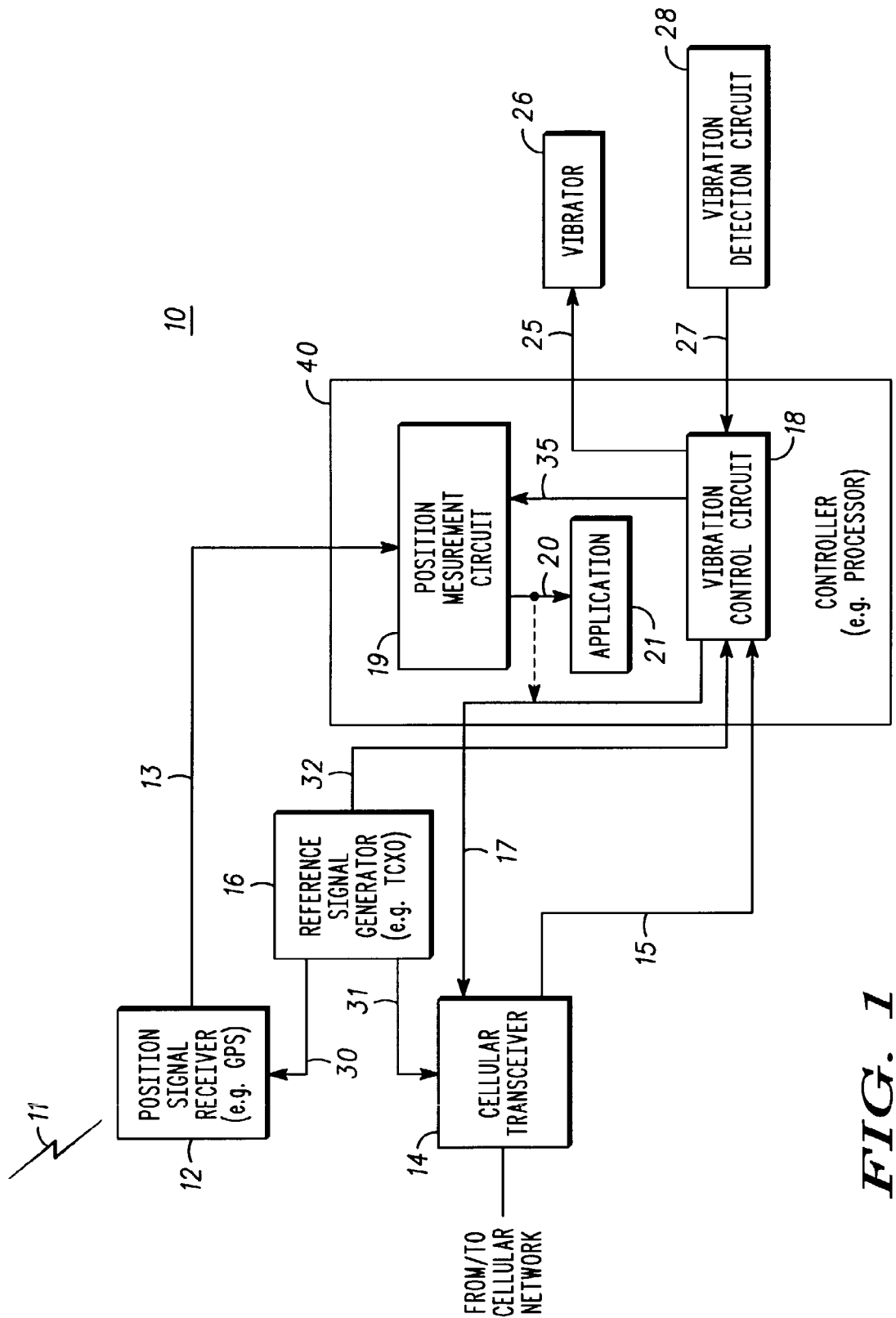
FIG. 1 is a schematic block diagram of an exemplary device incorporating a vibration control circuit according to the present invention.

FIG. 1 is a schematic block diagram of a device employing the vibration control circuit and method of the present invention. The device 10 can be embodied as any suitable mobile communication device including, but not limited to, a global positioning device, a cellular telephone, Internet appliance, laptop computer, palmtop computer, personal digital assistant, or a combination thereof such as a global positioning device accessory mechanically coupled to a communication device. For purposes of illustration only, a cellular telephone is exemplified, and includes: a position detector such as a position signal receiver 12; a cellular transceiver 14; a reference signal generator 16, such as a temperature compensated reference oscillator (TCXO), a vibration control circuit 18; a position measurement circuit 19; and a vibrator 26. The position signal receiver 12 may include, for example, an antenna and a filter or other suitable demodulation mechanism capable of converting position signals included as part of received satellite or non-satellite network data 11, into position signals 13 having a format suitable for processing by the position measurement circuit 19.

The position measurement circuit 19 generates position information 20 (e.g. x-y coordinates, latitude/longitude coordinates, or other suitable information) relating to the location of the device 10 by processing the position signals 13 according to a suitable (e.g. GPS) protocol. The position information 20 may then be provided to an application 21, for example, a mapping program or display application for further use therein. Additionally, the position information 20 may be provided to the cellular transceiver 14 for transmission to a central location (not shown) for additional processing. In application, the position measurement circuit 19 is a software application executed by controller 40, which is represented as a processor. However, it will be appreciated by one of ordinary skill in the art that the position measurement circuit 19 may be implemented in any suitable structure such as, but not limited to, a digital signal processor (DSP), a dedicated piece of hardware (e.g. ASIC), discrete logic circuitry, state machine or any device that manipulates signals based on operational instructions or software executing on one or more processing devices, capable of generating position information 20 based on the position signals 13, firmware or any suitable combination thereof. The operational instructions or software would be stored in a memory (not shown), which may include a single memory device or a plurality of memory devices. Such a memory device may include any memory element that stores digital data including, but not limited to, RAM, ROM, distributed memory such as servers on a network, or CD-ROM.

The cellular transceiver 14 may include an antenna and/or modulation and demodulation circuitry capable of converting, for example, voice and/or image data, also present in the satellite or non-satellite network data 11 into cellular signals 15 having a format suitable for manipulation and processing by the vibration control circuit 18. Voice and/or image data 17 may be provided by the vibration control circuit 18 to the cellular transceiver 14 for transmission over a cellular network.

The vibration control circuit 18 generates a processing control signal 35, for example, an interrupt that controls the operation of the position measurement circuit 19 to prevent the position measurement circuit 19 from performing position information generation operations during mechanical vibrations of the device. As used herein, control includes pausing or aborting position information generation when the device 10 is vibrating or otherwise disturbed, or placing the vibrator 26 in an inactive state and allowing position information generation to occur when the vibrator 26 is in the inactive state. The vibration control circuit 18 generates a vibration control signal 25, in response to a vibration event, such as receiving an incoming call alert in cellular signals 15. Additionally, the vibration control circuit 18 can control the operation of the vibrator 26, such that the vibrator is not active during position measurement operations. By preventing position information generation from being performed during periods of device vibration and controlling vibrator 26 operation, the position measurements performed by the position measurement circuit 19 are more accurate while, at the same time, preventing some wear and tear on underlying device components.

The vibration control circuit 18 may be implemented in any suitable structure such as, but not limited to, a DSP, an ASIC, a discrete logic circuit, a state machine or any device that manipulates signals based on operational instructions or software executing on one or more processing devices, or any suitable combination thereof. The operational instructions or software may be stored in a memory (not shown), which may include a single memory device or a plurality of memory devices. Such a memory device may include any memory element that stores digital data including, but not limited to, RAM, ROM, distributed memory such as servers on a network, or CD-ROM. In application, the vibration control circuit 18 is a software application being executed by the controller 40, which is represented as a processor.

The vibrator 26 alerts the user of the device 10 of receipt of incoming cellular (e.g. voice and/or image) signals 15. The vibrator 26 is switchable between an active (e.g. vibrating) state and an inactive (e.g. non-vibrating) state based on the vibration control signal 25 provided by the vibration control circuit 18. In operation, when an incoming cellular signal 15 is received by the vibration control circuit 18, the vibration control signal 25 is asserted, thereby, causing the vibrator 26 to vibrate which alerts the user of an incoming cellular signal 15. If no cellular signal 15 is received, or position information generation is being performed by the position measurement circuit 19, the vibration control signal 25 is de-asserted, thereby deactivating the vibrator 26. At the conclusion of vibration sensitive operation, or position signal generation, the vibrator may be activated to alert the user of the incoming call.

Although described as including a vibrator 26, it will be recognized and appreciated that there are alternate embodiments to the above illustrated embodiment. For example, the vibrator 26 may be replaced with a non-vibrating alert mechanism such as a light emitter or tone generator operable during position detection. Alternatively, an optional vibration detection circuit 28 may be operatively coupled to the vibration control circuit 18. The vibration detection circuit 28 detects other vibration events, for example, when at least a portion of the device 10 is being shaken or otherwise disturbed (e.g. dropped) and provides a vibration detection signal 27 to the vibration control circuit 18 indicating such an event. In response to the vibration detection signal 27, the vibration control circuit 18 provides the processing control signal 35 to the position measurement circuit 19, which controls the operation of the position measurement circuit 19 to prevent position information generation during mechanical vibrations of the device 10. Such a vibration detector can be employed in devices including, or not associated with a vibrating alert. The vibration detection circuit 28 may be an accelerometer or other suitable component capable of detecting mechanical vibrations of at least a portion of the device 10, such as the portion of a multiple component device including a position measurement circuit.

As illustrated, the reference signal generator 16 is a temperature compensated reference oscillator (TCXO) that provides control signals 30-32 which control the timing of the vibration control circuit 18, including the position measurement circuit 19, the position signal receiver 12 and the cellular transceiver 14. In application, the TCXO 16 provides a 26 MHz control signal 30 to the position signal receiver 12; a 26 MHz control signal 31 to the cellular transceiver 14 and a 26 MHz control signal 32 to the vibration control circuit 18. Although described as being a temperature compensated reference oscillator, the reference signal generator 16 may also be a crystal oscillator or other suitable signal generator. The TCXO 16 is very sensitive to vibrations or other disturbances. When the TCXO 16 vibrates, or is otherwise disturbed, the resulting control signals 30-32 deviate from normal baseline range. For example, when the TCXO 16 is shaken, the control signals 30-32 may experience low frequency modulation variations, which may have an adverse effect on the operation of the several components that are controlled by the TCXO 16.

Figure 2:
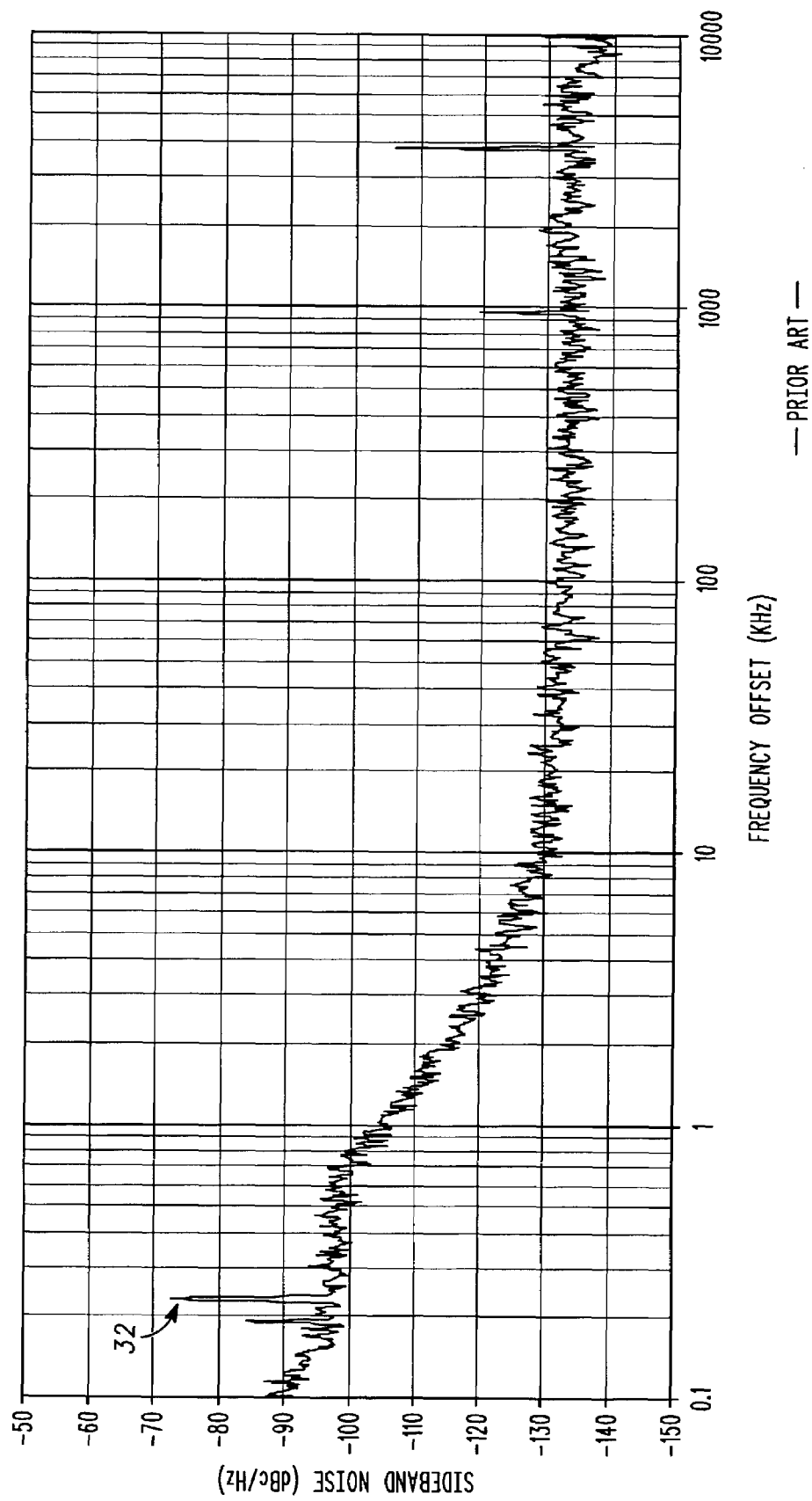
FIG. 2 is a graph of sideband noise versus frequency offset illustrating the effects on reference signal frequency characteristics caused by vibrations of electronic devices not employing the vibration control circuit of the present invention.

FIG. 2 is a graph of sideband noise versus frequency offset in a situation where the TCXO 16 is shaken or otherwise disturbed without the vibration control of the present invention. As shown in FIG. 2, at the lower frequencies the control signal 32 provided to the vibration control circuit 18 exhibits a variance range, for example, from between−88 dBc at 100 hz to approximately−104 dBc at 1 Khz. Such modulation of the control signal 32 causes the transmission of data to the vibration control circuit 18 to be erratic and/or causes the position measurement circuit 19 to operate incorrectly. Either situation will result in an inaccurate position measurement being performed. A principal cause of TCXO 16 disturbance, and hence control signal modulation, is the vibrator 26. The present invention substantially reduces or eliminates the adverse effects on position measurements or position information generation due to vibrations by controlling the performance of position information generation during operation of the device 10 such that position information generation is not performed during any vibration or disturbance conditions.

Figure 3:
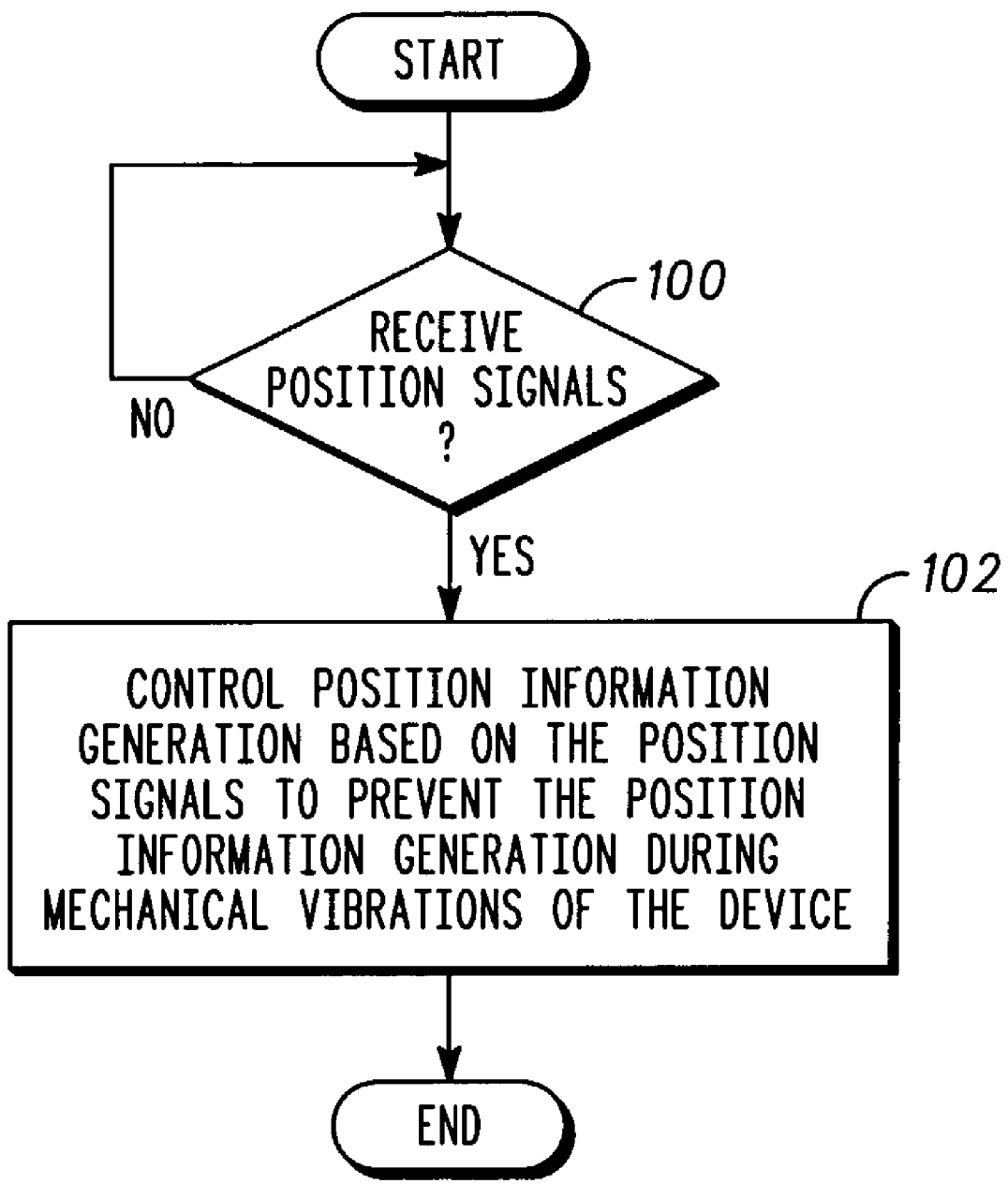
FIG. 3 is a flow chart of the operating steps performed by the device illustrated in FIG. 1 according to an exemplary embodiment of the present invention.

FIG. 3 is a flowchart of the operating steps performed by the device 10 for controlling position information generation according to the present invention. The process begins at step 100 where a determination is made as to whether an incoming position signal is received, for example, by the position measurement circuit 19 polling its input for an incoming position signal. If a position signal is not received, the current device 10 state is maintained.

If a position signal is received, the process continues to step 102, where the vibration control circuit 18 controls the position information generation based on the position signals to prevent position information generation during mechanical vibrations of the device 10. Exemplary operating steps performed by the vibration control circuit 18 to control position information generation are illustrated in FIGS. 4 and 5.

Figure 4:
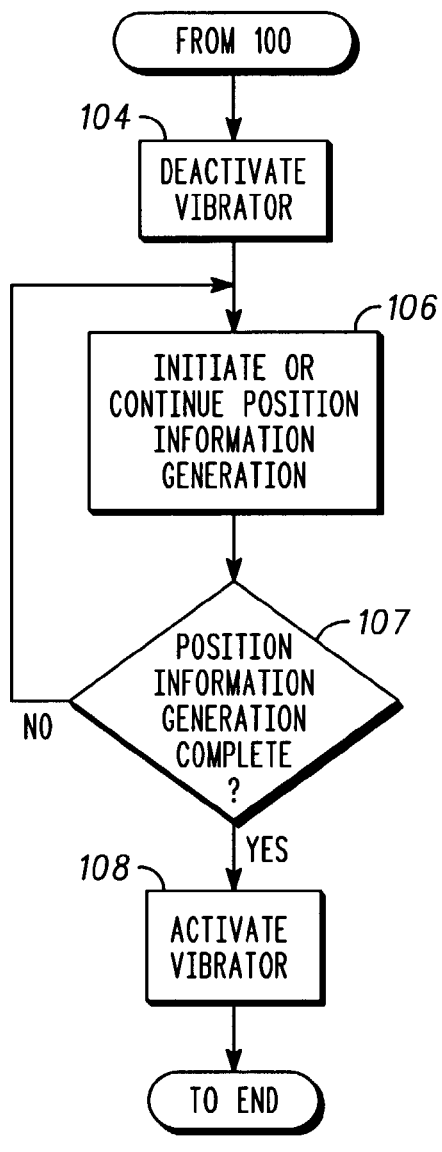
FIG. 4 is a flow chart of the operating steps performed by the device illustrated in FIG. 1 for controlling position information generation according to the present invention.
Figure 5:
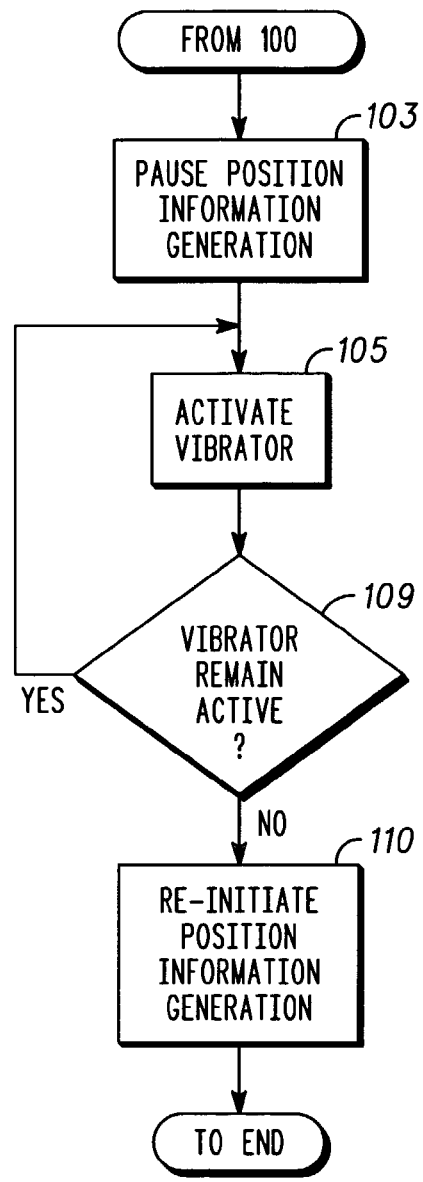
FIG. 5 is a flow chart of the operating steps performed by the device illustrated in FIG. 1 for controlling position information generation according to an alternate embodiment of the present invention.

FIG. 4 presents the situation during the processing of the position signals by the position measurement circuit 19 such as when the processing is almost complete or, alternatively, position information generation is about to start. In step 104 the vibrator 26 is deactivated, for example, by the vibration control circuit 18 de-asserting the vibration control signal 25; thereby preventing the vibrator 26 from vibrating during the position information generation.

In step 106, position information generation is initiated or continued by the position measurement circuit 19 processing the position signals 13 provided by the position signal receiver 12 according to a GPS or other suitable position measurement protocol. The specifics of the GPS position measurement protocol are well known to those of ordinary skill in the art and will not be further discussed herein so as not to obscure the disclosure or deviate from the description of the present invention. Position information generation is not initiated or continued until after the vibrator 26 is deactivated. In this manner, position information generation is allowed to occur when the vibrator 26 is in the inactive state. Thus, any vibration or other disturbances caused by the vibrator 26 is avoided and will have no adverse effects on control signal generation and receipt or position information generation.

In step 107, a determination is made as to whether position information generation is complete, for example, by detecting termination of the GPS position measurement protocol. If position information generation is not complete, the method returns to step 106 until position information generation is completed. As shown in step 108, if the position information is complete, the vibrator 26 is switched to the active state, for example, by the vibration control circuit 18 asserting the vibration control signal 25, such that the user may then be alerted as to any incoming voice or data signals.

FIG. 5 presents the situation where a cellular signal 15 is received by the vibration control circuit 18 while the position measurement circuit 19 is processing the position signals according to a suitable position measurement protocol. In step 103 position information generation is paused by the vibration control circuit 18 sending the processing control signal 35 to interrupt any calculations being performed by the position measurement circuit 19; thereby, allowing the incoming cellular signal 15 to be processed by the vibration control circuit 18. Any intermediate position information generated at the time of pausing, may be stored for subsequent use. The received cellular (e.g. non-position information) signal 15 causes the vibration control circuit 18 to activate the vibrator 26, by asserting the vibration control signal 25, in step 105 in order to alert the user of the receipt of the cellular signal 15 or other non-position information.

In step 109, a determination is made as to whether the vibrator 26 is to remain active, indicating that the user has not acknowledged the alert. If the alert has not been acknowledged, the method returns to step 105 until the alert is acknowledged. Otherwise, the method continues to step 109.

In step 110, position information generation is re-initiated from where earlier paused by the vibration control circuit 18 terminating the processing control signal 35 Thus, the stored intermediate position information may be used in completing the position information generation. Optionally, the stored intermediate position information may be discarded and position information generation may be performed anew using the position signals 13 from the position signal receiver 12.

Alternatively, in step 103, the position information generation may be aborted in favor of the incoming cellular signal 15 or other non-position information. After notifying of the user of the incoming cellular signal 15 in step 105 and acknowledgement by the same, the vibration control circuit 18 may restart the position information generation operation in step 110.

Thus, among other advantages, the device and method of the present invention prevents vibrations caused, for example, by the vibrator 26 turning on or the device 10 being dropped or otherwise disturbed, from adversely affecting position information generation operations of the position measurement circuit 19. When position information generation is being performed, the vibrator 26 is deactivated so as not to disturb the control signal provided by the TCXO 16, or disturb the position information generation. Upon completion of position information generation, the vibrator 26 is activated; thereby, providing the ability to notify the user of any subsequent receipt of cellular signals 15 or other non-position information. Additionally, depending on how far along in the pending position measurement the position measurement circuit 19 is, the position information generation may be paused or aborted in favor of an incoming cellular signal 15.

Figure 6:
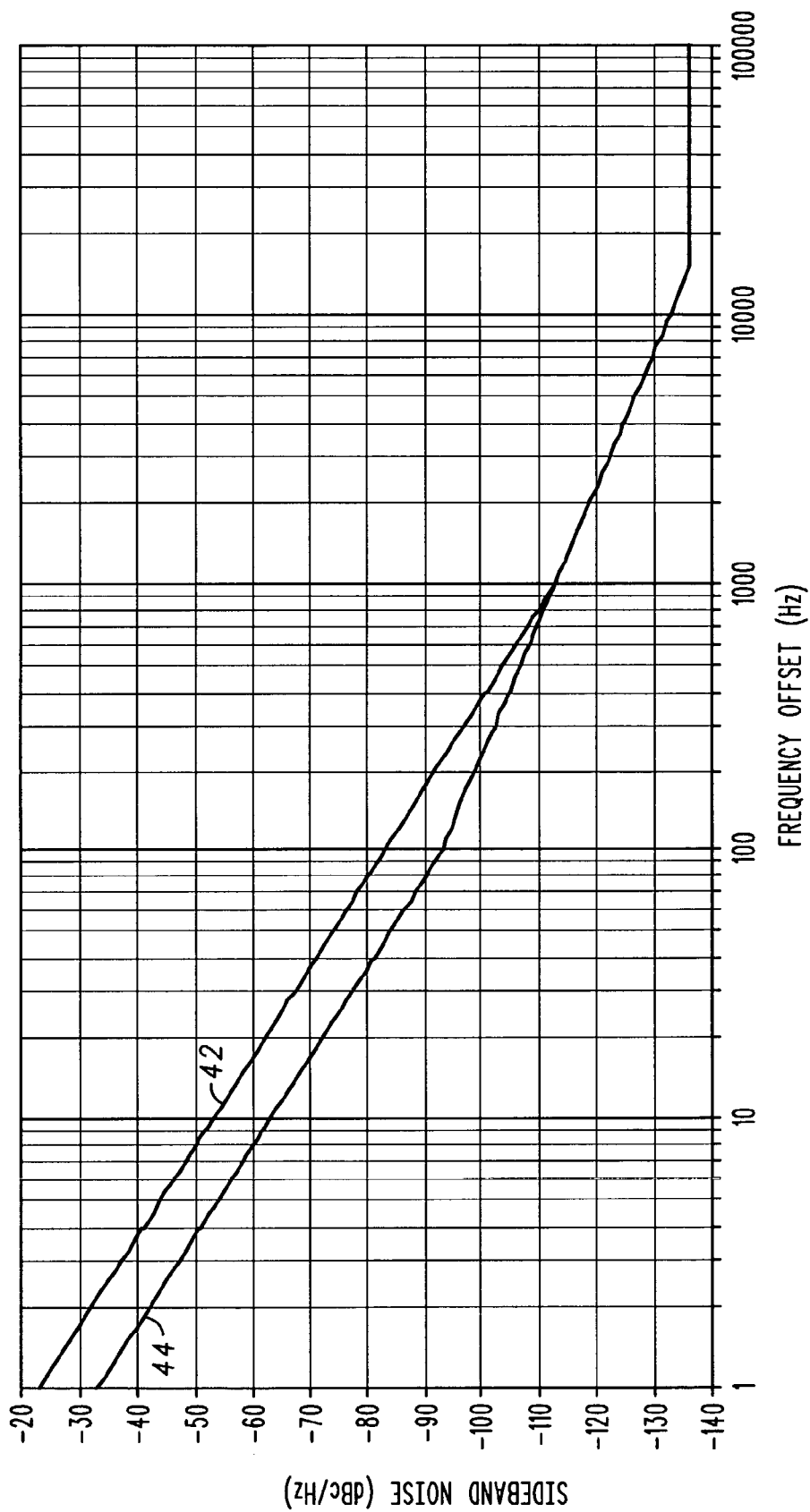
FIG. 6 is a graph illustrating an example of sideband noise versus reference signal frequency of the device illustrated in FIG. 1 after application of the vibration control circuit of the present invention.

FIG. 6 is a graph representing one example of sideband noise verses frequency. offset of the control signal provided by the TCXO 16 after application of the method of the present invention. Line 42 represents a normalized version of the sideband noise contained in the output signal of the TCXO 16 during operations when the vibrator 26 is active. As shown, at low frequencies, the sideband noise can obtain a value of approximately −24 dBc. By deactivating the vibrator 26, or otherwise preventing the device 10 from performing position information generation during shaking, the output of the TCXO 16 will be improved as illustrated by line 44. As shown, the maximum sideband noise provided by the TCXO 16 when the vibrator is dynamically controlled according to the present invention is about −34dB. Thus, in this example, the control signal noise resulting from application of the present invention is more than 5dBc less than when not controlled. As discussed above, performing GPS measurements requires a substantially stable clock at low frequency as the GPS measurements are very sensitive to even minor disturbances in the control signal. Reducing the amount of sideband distortion by more than 5dB is significant in that it results in a more stable control signal, which provides for a more readily calculated position measurement. Thus, by employing the method of the present invention, the position information generated by the position measurement circuit 19 can be generated more efficiently as compared to devices which do not deactivate or otherwise control the vibrator or position measurement circuitry to prevent generating position information during vibrations of at least a portion of the device.

The above detailed description of the invention and the examples described therein have been presented for the purposes of illustration and description. While the principles of the invention have been described above in connection with a specific device, it is to be clearly understood that this description is made only by way of example and not as a limitation on the scope of the invention.

What is claimed is:

1. A device, comprising:
   a receiver for providing position signals; and
   a vibration control circuit operative to control position information generation based on the position signals, to prevent position information generation during mechanical vibration of the device.

2. The device of claim 1, further including a position measurement circuit, coupled to the receiver and the vibration control circuit, operative to generate the position information based on the position signals.

3. The device of claim 2, wherein the vibration control circuit generates a processing control signal which prevents the position measurement circuit from generation position information during vibrations of the device.

4. The device of claim 3, wherein the processing control signal causes the position measurement circuit to perform at least one of: pausing position information generation and aborting position information generation.

5. The device of claim 1, further including a vibrator switchable between an active or inactive state in response to a vibration control signal from the vibration control circuit, wherein the vibration control circuit places the vibrator in the inactive state during position information generation, and wherein the vibration control circuit controls position information generation by allowing position information generation to occur when the vibrator is in the inactive state.

6. The device of claim 1, further including a vibration detection circuit operative to generate a vibration detection signal in response to detecting vibrations of at least a portion of the device.

7. The device of claim 6, wherein the vibration detection circuit is an accelerometer.

8. The device of claim 6, wherein the vibration control circuit generates a control signal which prevents a position measurement circuit from generating position information generation in response to the vibration detection signal.

9. The device of claim 8, wherein the processing control signal causes the position measurement circuit to perform at least one of: pausing position information and aborting information generation in response to the vibration detection signal.

10. The device of claim 1, further including a reference signal generator operative to provide control signals that control the operation of the receiver and the vibration control circuit.

11. The device of claim 10, wherein the reference signal generator is a temperature compensated reference oscillator.

12. The device of claim 10, wherein the reference signal generator is a crystal oscillator.

13. The device of claim 1, further including a cellular transceiver operative to transmit voice and/or image data between the device and a cellular network.

14. The device of claim 1, further including a vibration detection circuit operative to detect mechanical vibration that causes a reference signal for the receiver to have varying frequency characteristics.

15. A method for performing position measurements in a device, comprising:
    receiving position signals through a receiver; and
    controlling position information generation based on the position signals to prevent the position information generation during mechanical vibrations of the device.

16. The method of claim 15, wherein controlling position information generation includes pausing position information generation during mechanical vibrations of the device.

17. The method of claim 16, wherein controlling position information generation further includes re-initiating position information generation upon termination of the mechanical vibrations of the device.

18. The method of claim 15, wherein controlling position information generation includes deactivating a vibrator during position information generation.

19. The method of claim 18, wherein controlling position information generation further includes activating the vibrator upon completion of the position information generation.

20. The method of claim 15, wherein controlling position information generation includes aborting the position information generation.

21. A mobile communication device, comprising:
    at least one processor; and
    a memory, coupled to the at least one processor, the memory including instructions that, when executed by the at least one processor, cause the at least one processor to:
    receive position signals, and
    control position information generation based on the position signals to prevent the position information generation during mechanical vibration of the device.

22. The mobile communication device of claim 21, wherein the memory further includes instructions that, when executed by the at least one processor, cause the at least one processor to perform at least one of: pause position information generation and abort position information generation in response to detection of vibration of at least a portion of the device.

23. The mobile communication device of claim 22, wherein the memory further includes instructions that, when executed by the at least one processor, cause the at least one processor to re-initiate position information generation upon termination of the detection of vibration of at least a portion of the device.

24. The mobile communication device of claim 21, wherein the memory further includes instructions that, when executed by the at least one processor, cause the at least one processor to deactivate a vibrator during position information generation.

25. The mobile communication device of claim 24, wherein the memory further includes instructions that, when executed by the at least one processor, cause the at least one processor to activate the vibrator upon completion of position information generation.

26. The mobile communication device of claim 22, further including a vibration detection circuit.

27. A method of controlling operation of a device including a vibrator mechanically coupled to a position measurement circuit, the method comprising:

receiving a vibration event, temporarily preventing one of the vibrator and the position measurement circuit from operating while enabling the other of the vibrator and position measurement circuit.

28. The method of claim 27, wherein temporarily preventing includes disabling operation of the vibrator until the conclusion of position measurement operations sensitive to vibrations.

29. The method of claim 27, wherein temporarily preventing includes disabling position measurement operations sensitive to vibrations until the cessation of vibrations.

* * * * *